July 12, 1960  R. M. FRANZEL  2,945,165
LIQUID LEVEL MEASURING CAPACITOR
Filed Oct. 8, 1956
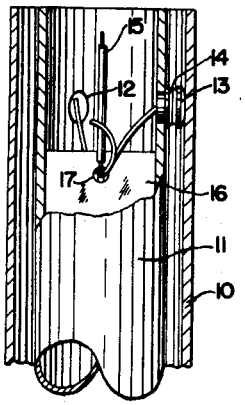
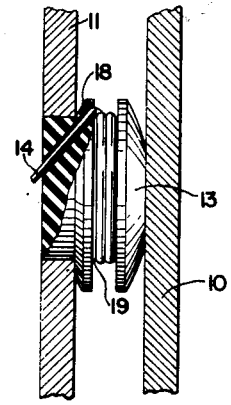
FIG. 2
FIG. 3
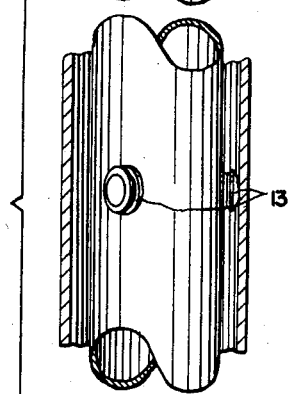
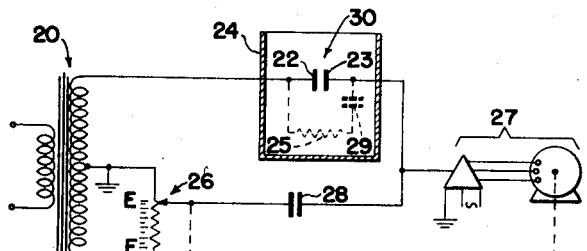
EQUIVALENT CIRCUIT NOT UTILIZING INVENTION
FIG. 4
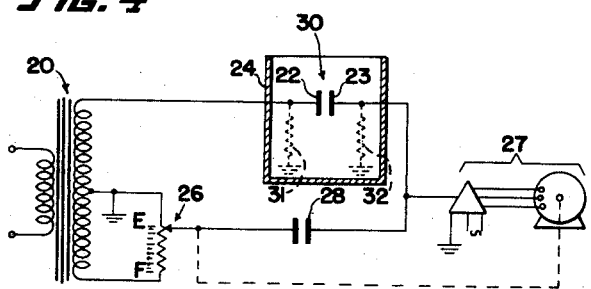
EQUIVALENT CIRCUIT UTILIZING INVENTION
FIG. 5
FIG. 1
INVENTOR.
RICHARD M. FRANZEL
BY
ATTORNEY United States Patent Office 2,945,165
Patented July 12, 1960

2,945,165

LIQUID LEVEL MEASURING CAPACITOR

Richard M. Franzel, Edina, Minn., assignor to Minneapolis-Honeywell Regulator Company, Minneapolis, Minn., a corporation of Delaware Filed Oct. 8, 1956, Ser. No. 614,575

3 Claims. (Cl. 317—246)

The present invention is concerned with a liquid level measuring capacitor, including insulating spacers for separating the electrodes thereof, for use with fluid having contaminants suspended therein, and having provision for eliminating or substantially reducing the effect resulting from conductive paths being set up between the electrodes of the measuring capacitor by the contaminants as they deposit on the spacers.

It has recently been observed that when measuring the amount of liquid in aircraft fuel tanks by capacitive methods, the readings were occasionally in error with the actual known amount of fuel contained within the tanks. Intensive investigation revealed that upon such occasions arising the fuel being measured contained contaminants, due to faulty storage, the physical make-up of the fuel, etc., which in the course of time deposited on the insulating spacers utilized to separate the electrodes of the measuring capacitor. The deposit of contaminants on the insulating spacers resulted in a conductive path being set up between the electrodes of the measuring capacitor, which path took the form of an electrical shunt across the forementioned electrodes. This path or electrical shunt naturally affected the accuracy of the measuring arrangement.

The conductive path set up by the contaminants can be eliminated by removing the spacers or neutralizing the electrical shunt. For obvious reasons the latter approach appeared the most practical and was pursued. The present invention resulted and is concerned with neutralizing the electrical shunt set up by the depositing of contaminants on the spacers, by effectively placing the conductive path at ground or reference potential. This is accomplished by insuring that every possible path on the insulating spacers between the electrodes of the measuring capacitor crosses a conductor, which conductor is connected to ground or reference potential. With such an arrangement, there is no need for filtering the fuel or other liquid being measured, and likewise, there is no fear that the arrangement will give faulty readings due to the contaminants contained within the fuel or other liquid.

It is an object of this invention to provide an arrangement to eliminate or substantially reduce the effect of the conductive path set up between the electrodes of a liquid level measuring capacitor due to the contaminants contained within the liquid being measured.

It is a further object of this invention to provide an arrangement wherein the insulating spacers located between the electrodes of a liquid measuring capacitor each have a portion thereof connected to ground potential, so that any conductive path set up between the electrodes of the measuring capacitor, due to the contaminants contained within the liquid being measured, crosses said portion and is effectively grounded.

It is a further object of this invention to provide liquid level measuring capacitor including insulating spacers for separating the electrodes of the capacitor wherein every path over the surface area of said spacer and between the electrodes of said capacitor is effectively connected to a reference potential.

These and other objects will become apparent from a reading of the following specification and appended claims wherein:

Figure 1 is a simplified view of a liquid level measuring capacitor including a preferred embodiment of the insulating spacer arrangement which forms the basis of this invention;

Figure 2 is a plan view of the liquid level measuring capacitor of Figure 1;

Figure 3 is a partial cross-sectional view of the liquid level measuring capacitor and insulating spacer arrangement of Figure 2 taken along the line 3—3;

Figure 4 is a simplified capacitive type liquid level measuring circuit showing the liquid level measuring capacitor connected therein and the electrical effect caused by the contaminants contained within the liquid being deposited across the insulating spacers, when the present invention is not utilized; and Figure 5 is a simplified capacitive type liquid level measuring circuit showing the liquid level measuring capacitor connected therein and the electrical effect caused by the contaminants contained within the liquid being deposited across spacers, when the present invention is utilized.

As shown in Figure 1, the liquid level measuring capacitor, shown in simplified form, is comprised of an outer electrode or plate 10 and an inner electrode or plate 11. Equiangularly disposed about and located within openings 12 of the inner electrode 11 are a plurality of spacers 13 which are comprised of an insulating material, such as nylon. The spacers are utilized to accurately locate the inner electrode 11 with respect to the outer electrode 10. Suitable means, not shown, are provided for insuring against longitudinal movement of the inner electrode 11 with respect to the outer electrode 10. Disposed about and in intimate contact with a portion of the spacers, which portion is disposed between the inner electrode 11 and the outer electrode 10, is a conductor 14. A portion of the conductor 14 is passed through an opening 18 located in the spacers 13, as best shown in Figure 3, and is suitably attached to a lead wire 15, which in turn is connected to a ground or reference potential, not shown. A lead wire support 16 has an opening 17 through which the conductors 14 pass for suitable connection to the lead wire 15.

The tubular shape of the outer electrode 10 and inner electrode 11, the position of the spacers 13 about the peripheries thereof, and the location of the lead wire support 16 is best shown in Figure 2.

With regard to Figure 3, it will be noted that should contaminants deposit across the insulating spacer 13, it would also deposit across a reduced portion 19 thereof and across the conductor 14. By depositing on the conductor 14, the path set up would be effectively grounded, or connected to reference potential, and no conductive path would be established between the inner electrode 11 and the outer electrode 10.

Without the utilization of the grounded conductor 14 placed about the reduced portion 19 of the insulating spacer 13, a simple null balance capacitive liquid level measuring arrangement including a liquid level measuring capacitor disposed within a container of liquid including contaminants would result in an equivalent electrical circuit such as in shown in Figure 4. There, a bridge comprising a transformer 20 has one end of a secondary, which has a tap connected to ground or reference potential, attached to an electrode 22 which corresponds to one of the electrodes 10 and 11 of Figure 1, of a measuring capacitor 30. The electrode 22 and its companion electrode 23, which corresponds to the other of the electrodes 10 and 11 of Figure 1, are located within a container 24. The measuring capacitor 30, when electrically connected as shown, provides a signal indicative of the level of the liquid in the container 24. Within the container 24 is the liquid to be measured, which liquid includes contaminants which tend to deposit on the spacers located between the electrodes of the measuring capacitor 30 to form a conductive path therebetween. For sake of clarity, the insulating spacers have not been shown in Figure 4, however, it should be remembered that they are located between the electrodes. The impedance of the conductive path which is set up on the spacers takes the form of a resistor 25 and a capacitor 29 placed in shunt across the measuring capacitor 30. Across the bottom half of the secondary, a rebalance potentiometer 26 is located. The wiper of potentiometer 26 is positioned along the winding thereof dependent upon the level of the liquid in the container 24, and cooperates with appropriate indicia to indicate the amount of liquid in the container 24. A reference capacitor 28 is associated with the wiper of the potentiometer 26 to provide a rebalance signal equal to, but of an opposite phase from, the signal derived from the measuring capacitor 30. Amplifier-reversible motor arrangement 27 may be of the type shown in the Upton Patent 2,423,534. The amplifier-motor arrangement 27 is operative upon a differential signal occurring in the bridge between the signals derived from the measuring capacitor 30, which is of a first phase, and the rebalance signal, which is of an opposite phase and of a magnitude determined by the position of the wiper of potentiometer 26 along the winding thereof. The differential signal between the foregoing signals is passed to the amplifier to cause the motor to drive the wiper of the potentiometer 26 along the winding thereof in the appropriate direction to bring about equalization of the signals and balance of the bridge. It can be seen that when the electrical shunt, comprised of resistor 25 and capacitor 29 which is due to the conductive path established across the spacers, is introduced into the system an inaccuracy will result. The electrical shunt in effect changes the total impedance in the upper half of the bridge, thereby resulting in a different signal being passed to the amplifier. This, of course, results in the wiper of the potentiometer 26 assuming a position different from that which it would normally assume without the electrical shunt. As the position of the wiper of the potentiometer 26 is indicative of the amount of liquid in the container 24, it can be seen that the conductive path in the form of an electrical shunt across the measuring capacitor will result in an erroneous reading.

To remedy the situation described above, a conductor is so situated with respect to the insulating spacers that any conductive path that forms across the spacers is effectively connected to ground or reference potential. With such an arrangement, an equivalent electrical arrangement such as is shown in Figure 5 results. It will be noted that the various components are the same and bear the same reference numerals as those described in conjunction with Figure 4. However, it will be noticed that instead of a resistor and a capacitor placed in shunt across the measuring capacitor 30 comprised of electrodes 22 and 23, resistors 31 and 32, which are at ground or reference potential, are placed on either side of the electrodes 22 and 23. This in effect is what happens when a conductive path is set across the spacers, due to contaminants in the liquid, and a conductor is provided and effectively connected to ground or reference potential such as shown in Figures 1, 2 and 3. With such an arrangement the effect of the deposits on the system accuracy are negligible and an accurate reading is possible. This is because the impedance of the conductive path is divided and a portion thereof is placed in shunt across the upper half of the secondary of the transformer 20, which while it causes loading of the transformer does not effect the accuracy of the system. In a similar manner a portion of the impedance of the conductive path is placed in shunt across the input of the amplifier of the amplifier-reversible motor arrangement 27, which while it reduces the sensitivity of the amplifier, has no effect on the accuracy of the system.

It should be noted that by utilizing an arrangement, such as is shown in Figures 4 and 5, for liquid level measuring, that is, an arrangement including only a measuring capacitor and a reference capacitor, errors will arise in the readings which are not due to conductive paths being set up across the spacers by the depositing of contaminants thereon and which will not be corrected by the utilization of the present invention. Thus, no provisions have been made for compensating the arrangement for errors arising in the readings due to changes in dielectric constant of the liquid being measured or for changes in the density of the liquid being measured. These errors can be corrected by introducing the appropriate compensation such as is shown in the H. M. Hermanson Patent No. 2,769,338, issued November 6, 1956, and which is assigned to the assignee of the present patent.

As contaminants are posing a problem in aircraft fuel, it is imperative that a method be found for eliminating or substantially reducing the effect such contaminants could have on the accuracy of a capacitive liquid level measuring arrangement upon the contaminants depositing across the insulating spacers separating the electrodes of the measuring capacitor. There has been described herein an arrangement for accomplishing the forementioned. Thus by effectively connecting any conductive path set up across the insulating spacers between the electrodes of the measuring capacitor to ground or reference potential, the electrical shunt which would normally occur is eliminated. While only one embodiment has been shown whereby contaminants in fuel have little, if any, effect on the accuracy of capacitive liquid level measuring arrangement due to a conductive path being set up between the electrodes of the measuring capacitor, the scope and breadth of the invention should be determined by the following claims in which I claim:

1. A capacitor for use in liquid measuring apparatus comprising, in combination: a first cylindrical element comprising a first electrode and having a plurality of holes at predetermined spaced points throughout the length thereof; a second cylindrical element comprising a second electrode and mounted in concentric relationship with respect to said first element; means spacing said first and second electrodes with respect to each other, said last named means comprising a plurality of insulative spacers disposed in the holes in the first cylindrical element, each spacer having a first and a second portion abutting said first and second cylindrical elements respectively and providing a mechanical connection between said first and second elements upon which contaminants may deposit causing a resistive path between said first and second electrodes; and means comprising a conductive element contiguous the surface of each of said spacers and insulated from said electrodes so that any contaminants connecting said first and second electrodes across any spacer also contact said conductive element.

2. A capacitor for use in liquid measuring apparatus comprising, in combination: a first cylindrical element comprising a first electrode; a second cylindrical element comprising a second electrode and mounted in concentric relationship with respect to said first element; and means spacing said first and second electrodes with respect to each other, said last named means comprising a plurality of insulative spacers disposed at a plurality of predetermined points throughout the length of said cylindrical elements, each spacer having a first and a second portion abutting said first and second cylindrical elements respectively and a conductive element mounted intermediate said first and second portions and each spacer providing a structural path between said first and second electrodes upon which contaminants may deposit causing a resistive path between said first and second electrodes.

3. A capacitor for use in liquid measuring apparatus comprising, in combination: a first cylindrical element comprising a first electrode having a plurality of holes therethrough at predetermined spaced points; a second cylindrical element comprising a second electrode mounted in concentric relationship with respect to said first element; spacing means separating said first and second electrodes with respect to each other, said spacing means comprising a plurality of insulative spacers disposed in the holes through the first element, each spacer having first and second portions abutting said first and second elements respectively and providing a mechanical connection therebetween upon which contaminants may deposit causing a resistive path between said first and second electrodes; and conductive means interposed between said first and second electrodes, insulated therefrom and contiguous with said spacers so that said conductive means forms a portion of any such resistive path.

References Cited in the file of this patent

UNITED STATES PATENTS

| | | |
|---|---|---|
| 415,504 | Fowler | Nov. 19, 1889 |
| 2,563,281 | Griffith | Aug. 7, 1951 |
| 2,718,620 | Howe | Sept. 20, 1955 |
| 2,759,134 | Sullivan | Aug. 14, 1956 |
| 2,802,975 | Weber | Aug. 13, 1957 |